G. W. PIERCE.
SPEED LIMITING APPARATUS FOR MOTOR VEHICLES.
APPLICATION FILED APR. 12, 1912.
1,140,060.
Patented May 18, 1915.
2 SHEETS—SHEET 1.
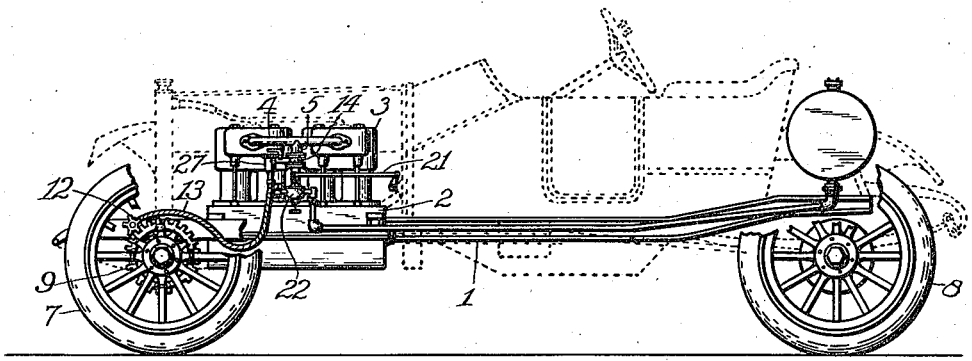
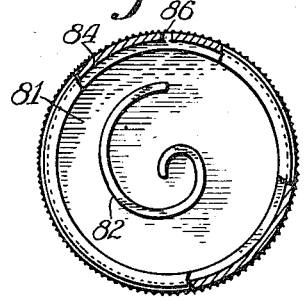
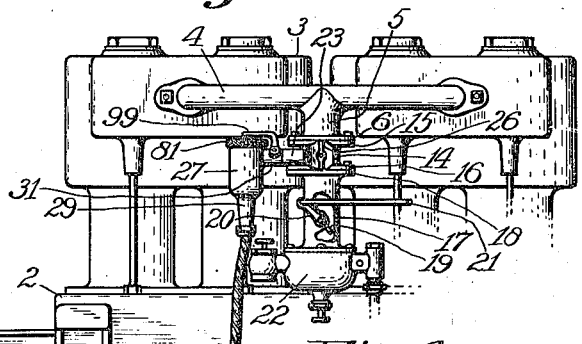
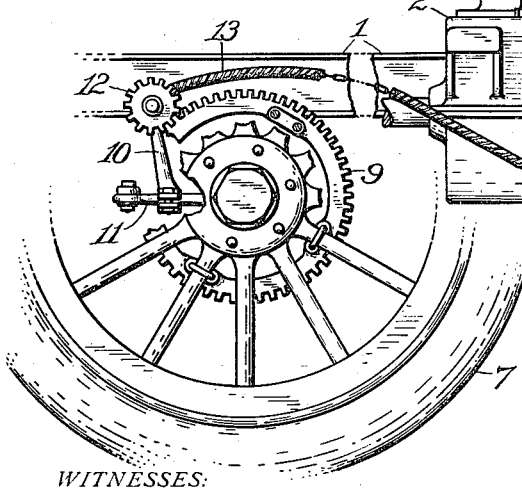
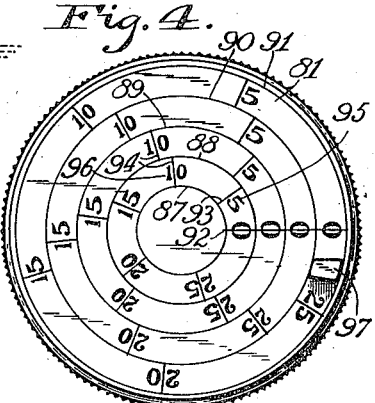
WITNESSES:
J. H. Gardner
M. J. Messenheimer
INVENTOR:
George W. Pierce,
BY
E. T. Silvius
ATTORNEY.

G. W. PIERCE.
SPEED LIMITING APPARATUS FOR MOTOR VEHICLES.
APPLICATION FILED APR. 12, 1912.
1,140,060.
Patented May 18, 1915.
2 SHEETS—SHEET 2.
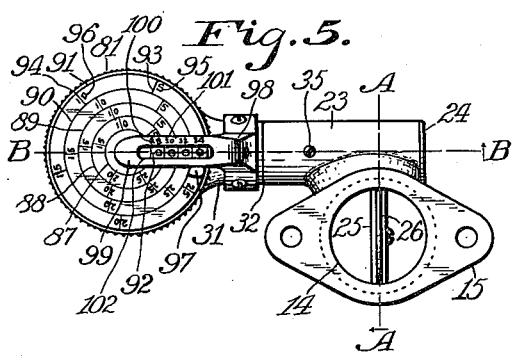
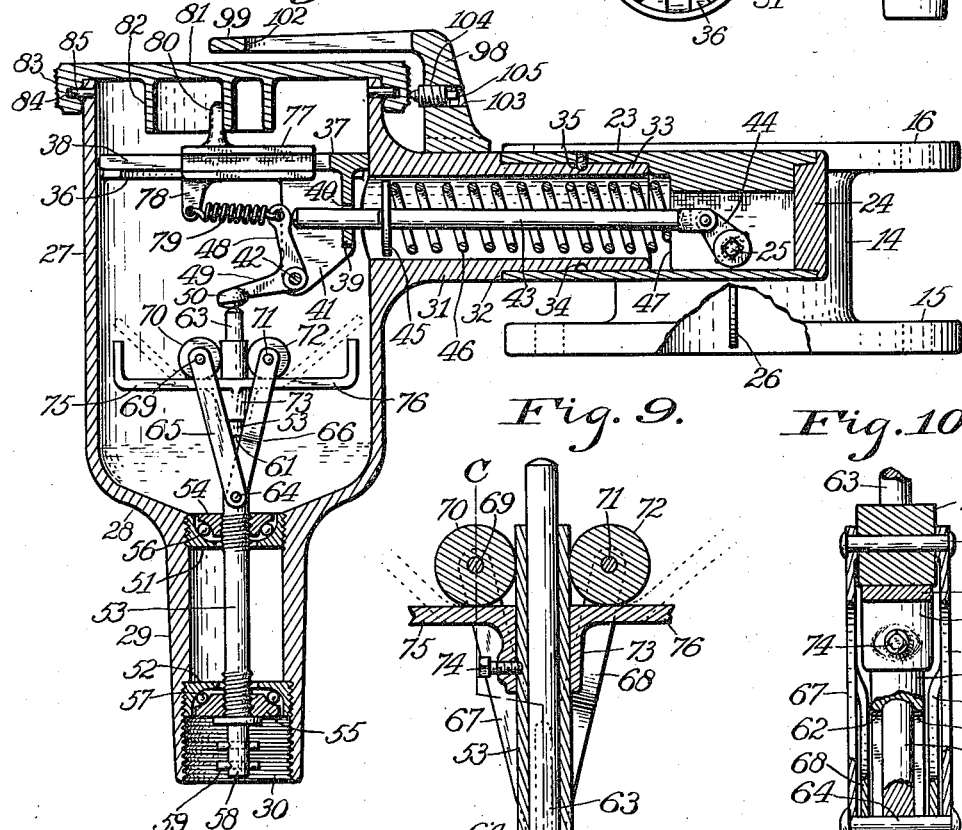
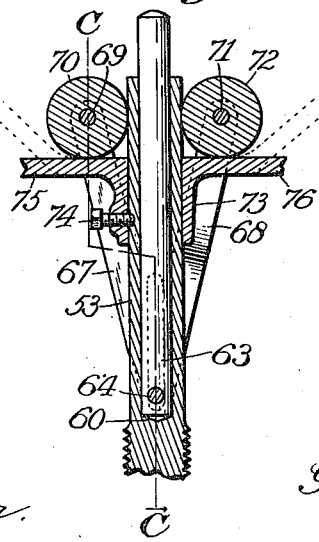
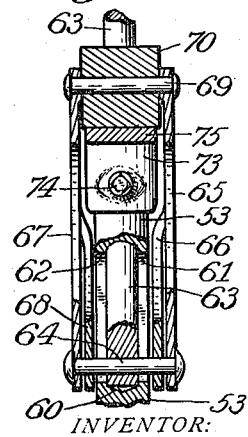
WITNESSES:
J. H. Gardner.
M. J. Messenheimer.
INVENTOR:
George W. Pierce,
BY
E. T. Silvius,
ATTORNEY.

UNITED STATES PATENT OFFICE.

GEORGE W. PIERCE, OF ANDERSON, INDIANA, ASSIGNOR TO THE PIERCE SPEED CONTROLLER COMPANY OF ANDERSON, INDIANA, A CORPORATION.

SPEED-LIMITING APPARATUS FOR MOTOR-VEHICLES.

1,140,060.      Specification of Letters Patent.      Patented May 18, 1915.

Application filed April 12, 1912. Serial No. 690,321.

*To all whom it may concern:*

Be it known that I, GEORGE W. PIERCE, a citizen of the United States, residing at Anderson, in the county of Madison and State of Indiana, have invented a new and useful Speed-Limiting Apparatus for Motor-Vehicles, of which the following is a specification, reference being had to the accompanying drawings and to the letters and figures of reference marked thereon.

This invention relates to apparatus for preventing drivers of automobiles or other motor vehicles from operating them at unauthorized or recklessly high speed, the invention having reference more particularly to vehicles having explosion engines and to means whereby the speed of the engines may be variably limited at the discretion of the vehicle owners or those responsible for their maintenance.

An object of the invention is to provide an improved speed limiting appliance that shall be so constructed as to be adapted to variably limit the speed of an automobile or auto truck and be operated and controlled by one of the carrying wheels of the vehicle, in order that the regulation sought shall be accurate and reliable.

Another object of the invention is to provide speed limiting apparatus of the above mentioned character that will be adapted for universal application so as to be operative on vehicles of different types and sizes, different vehicles of which may have carrying wheels of different diameters.

A still further object is to provide improved speed limiting means of the above mentioned character that will not interfere with the free operation and control of the engine and the vehicle at all speeds under that at which the limit is placed.

Other objects of the invention will be apparent from the following description of construction and operation of the invention.

The invention consists in speed limiting means for explosion engines and essentially embracing a valve for limiting the supply of explosive mixture to the engine of a motor vehicle for limiting the speed of the vehicle, and means driven by one of the vehicle wheels which determine and control the speed at which the vehicle may be moving, for operating and controlling the fuel limiting valve. And the invention consists further in the novel parts, and in the novel combinations and arrangements of parts, as hereinafter particularly described and claimed.

Referring to the drawings, Figure 1 is a fragmentary side elevation and outline of an automobile to which the invention is applied; Fig. 2, an inverted plan view partially broken away of one of the parts of the invention; Fig. 3, a fragmentary elevation of the automobile engine and one of the steering wheels, the invention being shown in connection therewith; Fig. 4, a top plan of the part shown in Fig. 2, being a combined indicator dial plate and spring-tension regulator; Fig. 5, a top plan of the speed limiting appliance; Fig. 6, a section on the line A A in Fig. 5; Fig. 7, a fragmentary plan of parts of the spring-tensioning apparatus; Fig. 8, a section on the line B B in Fig. 5 with the casing of the fuel controlling valve inverted; Fig. 9, a fragmentary section of parts of the apparatus for partially closing the controlling valve, and Fig. 10, a section approximately on the line C C in Fig. 9.

Similar reference characters in the different figures of the drawings indicate corresponding elements of features of construction herein referred to.

In order to explain the purpose, function and mode of operation of the invention a number of features of an automobile are herein briefly referred to, the numeral 1 indicating the autmobile frame, 2 the explosion engine frame, 3 the engine cylinders, 4 the intake manifold, and 5 the single inlet pipe thereof, the latter being provided with a flange 6. The numeral 7 indicates the steering wheels and 8 the driving wheels of the vehicle.

In order that the speed of the vehicle shall be accurately limited the apparatus preferably is operated by means of one of the steering wheels, and a gear wheel 9 of suitable diameter is secured to one of the wheels, a bracket 10 being secured to the adjacent steering arm 11 and supporting a pinion 12 in contact with the wheel 9, the pinion being of suitable diameter and connected to a flexible shaft 13 of suitable construction.

A valve casing 14 is provided which is preferably provided with a flange 15 at one end that is secured to the flange 6 of the manifold pipe 5, the opposite end of the casing being provided with a flange 16. A mixing tube 17 is provided with a flange 18 which is secured to the flange 16, the mixing tube having the customary butterfly type of fuel-controlling valve 19 therein provided with an operating arm 20 to which an operating rod 21 is connected, and a suitable carbureter 22 is connected to the mixing tube as is customary, for supplying the explosive mixture or fuel to the manifold, in the present case the fuel passing through the valve casing 14. The casing 14 has a substantially cylindrical hollow arm 23 cast integrally on the outer side thereof, the arm extending transversely to the bore of the casing, the arm having a head 24 in one end thereof. A rock-shaft 25 is mounted in the wall of the casing 14 and extends into the hollow arm, and a double palate balanced valve 26 is secured to the rock-shaft within the casing 14, the butterfly type of valve being shown, and it is obvious that any suitable type of valve for restricting or limiting the flow of the fuel through the casing may be employed.

A suitable cup shaped housing 27 is provided which is substantially cylindrical and has a bottom or end 28 on one end thereof from which extends a neck 29 provided with internal screw threads 30 in its end portion. The wall of the opposite end portion of the housing has a hollow supporting arm 31 thereon which is provided with a joint face 32, the end portion of the arm beyond the face being turned true to form a journal 33 which is seated rotatively in the arm 23, the journal having a circumferential groove 34 therein that receives a guide pin 35 secured in the wall of the arm 23, so that the journal is rotatively retained in the arm 23 and permits adjustment of the valve casing 14 relative to the housing 27, the latter preferably being normally in upright position while the valve casing 14 may be adjusted to the angle of the pipe 5 of the manifold. The upper portion of the housing 27 is provided with ledges 36 upon which the frame plate 37 is secured, the plate having a guide-way 38 therein extending inward from the edge thereof. The under side of the plate has a guide 39 thereon in which is a guideway 40, the plate having also wings 41 that are connected also to the guide 39 and support a pivot 42. A suitable valve rod 43 is guided at one end portion in the guide-way and extends through the arm 31 into the arm 23 and is suitably connected with the fuel controlling valve; as illustrated, the rock shaft 25 being provided with an operating arm 44 which is pivotally connected to the valve rod, the rod being provided with a collar 45 against which a strong coil spring 46 is seated, the spring being seated also against a shoulder 47 formed in the arm 23. The tendency of the spring is to move the controlling valve in one direction. A bell-crank is provided which is mounted on the pivot 42 and one arm 48 thereof extends into contact with the inner end of the valve rod 43, the other arm 49 of the bell-crank extending over to the longitudinal axis of the housing 27 and it has a suitable head 50 thereon. Two ball cups 51 and 52 are oppositely arranged and secured in the neck 29 of the housing, and an operating shaft 53 extends through the cups and is provided with two cones 54 and 55 that are arranged oppositely to the respective ball cups, and bearing balls 56 are placed between the cup 51 and the cone 54, similar balls 57 being placed between the cup 52 and the cone 55. The outer end portion 58 of the shaft 53 is suitably adapted for connection with the flexible shaft 13, the latter being provided with a suitable coupling device and may be adapted to receive a key 59 whereby the flexible shaft rotates the shaft 53. The inner end portion of the shaft 53 has a longitudinal bore 60 therein and the wall of the shaft has longitudinal slots 61 and 62 therein extending to the bore. A rod 63 of suitable length is provided and placed movably in the bore, the rod extending beyond the inner end of the shaft. The inner end portion of the rod is provided with a pivot pin 64 which extends through the slots 61 and 62. Two links 65 and 66 are connected to one end portion and two similar links 67 and 68 are connected to the opposite end portion of the pivot pin 64. An axle 69 is connected to the links 65 and 67 and has a roller 70 thereon, a similar axle 71 being connected to the links 66 and 68 and it has a roller 72 thereon. A hub 73 is suitably arranged on the shaft 53 and secured thereto preferably by a set-screw 74, and the hub has two guide arms 75 and 76 thereon which extend in opposite directions toward the wall of the housing 27 at any desired angle, which may be at right angles to the shaft, or at inclined angles as shown in dotted lines in Figs. 8 and 9, for guiding the rollers 70 and 72, the rollers when at rest being in contact with the shaft 53, and when forced outward by centrifugal force act through the links to move the rod outward from the bore 60. The projecting end of the rod 63, is in contact with the head 50, and therefore when the rod 63 is projected it is evident that the valve rod 43 is moved against the pressure of the spring 46 and moves the controlling valve in the direction opposite to that in which it is moved by the spring.

In order to increase and vary the resistance against the rod 63 and modify the action of the main spring 46 and the centrifugal force acting through the rollers 70 and 72 which serve the purpose of weights, a movable head 77 is slidingly mounted in the guideway 38 and it has an arm 78 thereon to which a relatively small auxiliary coil spring 79 is hooked, the spring being hooked also to the arm 48 of the bell-crank, and the arm being in contact with the valve rod 43 it is evident that the spring 79 augments the force exerted by the spring 46. The head 77 has also a finger 80 thereon for holding the head fixedly relative to the frame plate 37. The upper or head end of the housing 27 is provided with an indicator dial 81 which is suitably connected to the housing so as to be rotative relatively thereto, and its inner side has a suitable cam or scroll 82 thereon which is arranged with its outer side against the finger 80, the cam acting as a screw to force the head 77 transversely of the housing to increase the tension of the spring 79. The dial is so connected to the housing as to ordinarily prevent its removal, the dial plate preferably having a flange 83 extending about the body of the housing, the inner side of the flange having a groove 84 therein into which retaining pins 85 extend, the pins being driven tightly into the wall of the housing through an aperture 86 extending from the bottom of the groove to the outer side of the flange 83.

The top or outer face of the dial plate 81 has a suitable number of concentric rings 87, 88, 89, 90, 91 thereon, the spaces between the rings having zero marks 92 thereon and are divided by a suitable number of divisional marks, as 93 and 94 designated by numerals as 95, 96, corresponding to different speeds of the vehicle, such as five miles per hour, ten miles per hour or other rates as may be desired. The dial has a stop block 97 thereon at a suitable distance from the zero mark. A post 98 is suitably secured to the arm 31 so that it can be removed only with difficulty and it has an indicator arm 99 thereon that extends to the middle portion of the dial, the arm having different numbers as 100, 101, each number corresponding to the diameter of a carrying wheel of the vehicle, the numbers being above the concentric rings on the dial and each ring represents the diameter of the wheel. The arm 99 has a slot 102 therein through which to observe the numbers on the dial, the zero mark being seen through the slot when the stop block 97 is brought against one side of the arm, the limit of adjustability of the dial being reached when the stop block is moved around to the opposite side of the arm. Suitable provision is made to lock the dial plate so that it can not be readjusted by unauthorized persons. One form of lock only is illustrated in which the post 98 is provided with a transverse screw-threaded hole 103 into which a locking bolt 104 is screwed, the bolt being projected through the hole and against the flange of the dial plate so as to securely lock the dial to the housing and also to the post. The outer end of the lock-bolt is suitably provided with an irregular shaped shank 105 to which a suitable key may be applied for operating the lock-bolt, the shank being within the bolt-hole 103 and inaccessible excepting by means of a specially formed key.

In practical use the flexible shaft 13 is rotated by means of the vehicle wheel and rotates the shaft 53 which carries the guide arms 75 and 76, the rollers 70 and 72 being carried by centrifugal force outward on the arms so as to cause the links connected therewith to move the pivot pin 64 and project the rod 63, the rod transmitting its motion to the bell crank and thence to the valve rod 43 which causes the valve 26 to close more or less in proportion to the speed at which the vehicle is moving, the action being modified by varying the tension of the spring 79. If for instance an owner desires to limit the speed of the vehicle to ten miles per hour he sets the indicator dial so that the numeral "10" appears in the slot in the arm 99. The desired adjustment having been made the result is that the supply of fuel to the engine is curtailed to the required degree to reduce the speed of the engine sufficiently to limit the speed of the vehicle on the ground to the desired rate which can not be changed conveniently by the driver when operating the vehicle, nor by ordinary means.

It should be understood that the speed-limiting apparatus does not actuate the fuel-controlling valve until the speed of the vehicle increases to within about three or four miles per hour of any limit of speed at which the apparatus may be set, so that the usual operation of the vehicle at proper speeds is not interfered with, this result being due largely to the relatively light weight 70 and 72 and strong resistance spring.

Having thus described the invention, what is claimed as new is—

1. Speed-limiting apparatus including a movable valve-controlling rod, an inclosure for the rod, a resistance spring for the rod within the inclosure, a movable device mounted in the inclosure and connected with the spring, and a dial-plate adjustably connected with the housing and having a scroll on the inner side thereof coöperating with the movable device for varying the tension of the spring.

2. Speed-limiting apparatus including a movable controlling valve, a controlling rod for the valve, an inclosure for the valve and the rod, centrifugally influenced means in the inclosure for actuating the rod, a spring in the inclosure for yieldingly resisting the actuating means, a dial-plate rotatably connected with and closing the inclosure and having a scroll on the inner side thereof and indicating marks on the outer side thereof, and means for effecting operative connection between the scroll and the spring.

3. Speed-limiting apparatus including a movable controlling valve, an inclosing housing, a valve-rod operatively connected with the valve and extending into the housing, centrifugally influenced means inclosed in the housing for actuating the valve-rod, a spring inclosed in the housing for yieldingly resisting the actuating means, an indicating dial-plate adjustably connected with the housing and having means within the housing for adjusting and fixing the tension of the spring, and means for locking the dial-plate to the housing.

4. Speed-limiting apparatus including a casing, a housing connected to the casing, a controlling valve movably mounted in the casing, a bell-crank pivotally supported in the casing, operating connections between the bell-crank and the valve, centrifugally influenced means mounted in the casing and acting in connection with the bell-crank for moving the valve, a head adjustably supported in the casing and having a finger thereon, a spring between the head and the bell-crank, a dial-plate rotatively secured on the housing and having a cam on the inner side thereof that has contact with the finger for varying the tension of the spring, and means for fixedly locking the dial-plate to the housing.

5. Speed-limiting apparatus including a casing, a housing having a hollow arm connected to the casing, a controlling valve movably mounted in the casing, a connecting device movably mounted in the housing, a valve rod operatively connected with the valve and extending through the hollow arm to the connecting device, centrifugally influenced means mounted in the housing and acting in connection with the connecting device for moving the valve, a spring seated in the hollow arm and coöperating with the valve rod to partially resist action of the moving means, an auxiliary spring connected to the connecting device for variably augmenting the resisting force of the main spring, and means for variably adjusting and fixing the tension of the auxiliary spring.

6. In speed-limiting apparatus, the combination with a valve casing having a hollow arm thereon, a balanced controlling valve movably mounted in the casing, and a housing having connection with the arm, of a valve rod movably guided longitudinally in the casing and extending into the arm, means for connecting the rod with the valve, rotatable means in the housing responsive to centrifugal force for operating the valve rod, a dial plate rotatively adjustable on the housing and having a cam on the inner side thereof, the outer side of the plate having graduated concentric rings thereon representing various diameters of carrying wheels, an indicator arm supported by the housing and extending opposite the dial plate, the arm having numerals thereon opposite the rings designating the different diameters of the wheels, means for fixedly locking the plate to the housing, a head adjustably mounted in the housing and having contact with the cam, and a controlling spring connected with the head for yieldingly resisting the action of the rotatable means.

7. In speed-limiting means, the combination of a housing having a hollow arm thereon, a valve rod movably guided in the arm and having a collar thereon, a spring seated in the arm and against the collar for moving the rod inwardly, a bell-crank pivoted in the housing in contact with the rod, rotatable means mounted in the housing in contact with the bell-crank and responsive to centrifugal force for moving the valve rod outwardly, a head adjustable supported in the housing, a controlling spring connected to the head and the bell-crank, a dial plate rotatively adjustable on the housing and having a cam on the under side thereof engaging the head for varying the tension of the controlling spring, the plate having graduations on the outer side thereof, a post fixed on the hollow arm and having an indicator arm thereon extending opposite the dial plate, and a lock supported in the post for securing the plate to the housing.

8. In speed-limiting apparatus, the combination of a housing, a shaft rotatably mounted in the housing and having a bore therein and slots extending from the bore, a collar secured to the shaft and having two guide arms thereon, a rod movable in the bore and provided with a pivot pin extending through the slots, two pairs of links connected to the pivot pin, two axles connected to the links of the two pairs respectively, two rollers on the two axles respectively and guided on the two guide arms respectively, a bell-crank pivoted in the housing in contact with the rod, and a supported spring operatively connected with the bell-crank for yieldingly resisting the movement of the rollers away from the shaft on rotation of the shaft.

9. In speed-limiting apparatus, the combination of a housing having a hollow arm thereon, a bell-crank pivoted in the housing, a valve rod movably guided in the arm in contact with the bell-crank, a spring in the arm for holding the rod to the bell-crank, a controlling valve, means for connecting the valve rod with the valve, rotatable means in the housing responsive to centrifugal force and having contact with the bell-crank for moving the valve rod against the pressure of the spring, a controlling spring connected to the bell-crank for yieldingly resisting the action of the rotatable means, and adjustable means inclosed in the housing for varying and fixing the tension of the controlling spring.

10. In speed-limiting apparatus, the combination of a housing, a valve rod movably guided in the housing, the rod extending beyond the housing for operating a valve, a spring for moving the rod in one direction, rotatable means mounted in the housing and responsive to centrifugal force for moving the rod in the opposite direction, a motion transmitting device interposed between the rod and the rotatable means, a head in the housing, a controlling spring connected to the said device and the head, and means for adjusting and fixing the tension of the controlling spring.

11. In speed-limiting means, the combination of a valve casing having a hollow arm thereon, a housing having a hollow arm thereon that is rotatively connected with the arm of the casing, a shaft rotatively mounted in the casing, a valve secured to the shaft in the casing, a rock-arm secured to the shaft in the hollow arm of the casing, a rod extending from the housing through the arm thereof and into the arm of the casing and connected to the rock-arm, a bell-crank pivoted in the housing in contact with the rod, and means mounted in the housing for moving the bell-crank.

12. In speed-limiting apparatus, the combination of a housing having an opening therein, rotatable governor means in the housing responsive to centrifugal force for actuation thereof and provided with adjustable retarding means adapted for counteracting the centrifugal force, a dial-plate rotatively adjustable on the housing and closing the opening therein, the outer side of the plate having graduated concentric rings thereon representing various diameters of carrying wheels for the apparatus, means enabling the dial plate on movement to variably adjust the retarding means within the housing, an indicator arm fixedly supported by the housing and extending opposite the dial plate, the arm having numerals thereon opposite the rings designating the different diameters of the wheels, and means for fixedly locking the dial plate to the housing.

In testimony whereof, I affix my signature in presence of two witnesses.

GEORGE W. PIERCE.

Witnesses:
JOSEPH W. JACKSON,
MABEL K. MILLSPAUGH.